United States Patent [19]

Hirai

[11] 4,019,610

[45] Apr. 26, 1977

[54] FLOATING CALIPER DISC BRAKE

[75] Inventor: Hiroshi Hirai, Satte, Japan

[73] Assignee: Akebono Brake Industry Co., Ltd., Tokyo, Japan

[22] Filed: July 15, 1975

[21] Appl. No.: 595,996

[52] U.S. Cl. .............................. 188/73.3; 188/73.6
[51] Int. Cl.² ..................................... F16D 55/224
[58] Field of Search .............. 188/73.3, 73.6, 72.4, 188/72.5

[56] References Cited

UNITED STATES PATENTS

| 2,756,844 | 7/1956 | Chamberlain et al. | 188/73.3 |
| 3,261,430 | 7/1966 | Wilson et al. | 188/73.6 |
| 3,374,866 | 3/1968 | Miles | 188/73.3 X |
| 3,375,906 | 4/1968 | Hayes | 188/73.3 |
| 3,392,809 | 7/1968 | Hodkinson et al. | 188/73.3 X |
| 3,882,972 | 5/1975 | Newstead et al. | 188/73.6 X |

Primary Examiner—George E. A. Halvosa
Attorney, Agent, or Firm—Armstrong, Nikaido & Marmelstein

[57] ABSTRACT

The present invention relates to a floating caliper disc brake particularly used for large vehicles and industrial machineries, in detail, wherein a pair of left and right pins fixed to a support are arranged to guide inner and outer friction pads towards a disc and are removable to replace said friction pads as required, therefore, simplifying exchange of friction pads, and a pair of the pins are formed separately to receive the braking torque generated on the respective inner and outer friction pads so as to minimize strength of individual pin.

4 Claims, 4 Drawing Figures

FLOATING CALIPER DISC BRAKE

DETAILED DESCRIPTION OF THE INVENTION

Figure 1:
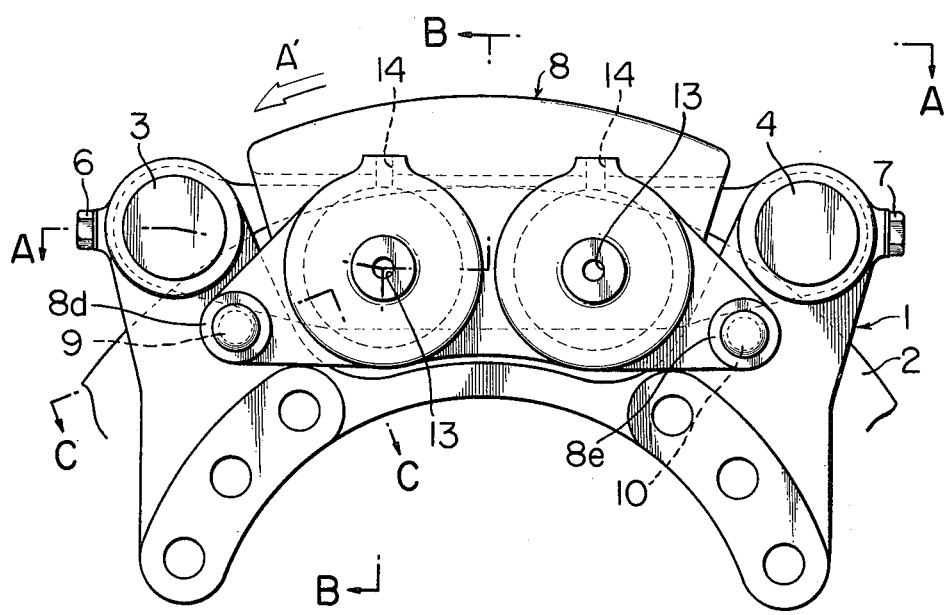
FIG. 1 is a front view in an embodiment of this invention.

The present invention relates to a floating caliper disc brake particularly adaptable to large vehicles and industrial machineries.

The disc brakes of the kind have been inferior in working property since the replacement of friction pads requires removal of a caliper from a support.

The first purpose of this invention is to provide easy and quick mounting and dismounting of inner and outer friction pads without removal of a caliper from a support at the occasions of pad replacement.

The invention attains this purpose by means of a pair of left and right pins which are releasably secured to a support fitted to a fixed vehicle element such as a knuckle, etc. at one side of a disc and extended in a rotational axis of said disc beyond the periphery of said disc and are slidably received into openings furnished at left and right sides of backing plates respectively associated with inner and outer friction pads interposing said disc.

The second purpose of the invention features in the arrangement that a caliper comprising a fluid pressure operating means which engages said inner friction pad with said disc and a reacting portion which engages said outer friction pad with said disc due to reaction of the former means is slidably mounted on left and right caliper guide pins other than said friction pad guide pins fixed to said support and guided towards said disc so that independent mounting and dismounting are effected in between said caliper and said friction pads.

The third purpose of the invention lies in the arrangement that one of said left and right friction pad guide pins which guide said inner and outer friction pads is fitted into one of openings furnished on backing plate of said inner friction pad with a clearance provided therebetween at least at entering side of rotation of said disc and the other one of said left and right friction pad guide pins which guide said inner and outer friction pads is fitted into the other one of openings furnished on backing plate of said outer friction pad other than one opening receiving the former pin with a clearance provided therebetween at least at entering side of rotation of said disc so that the braking torque generated on said inner and outer friction pads is separately shared by said left and right friction pad guide pins and the braking torque applied to the respective friction pad guide pins is lessened since the braking torque generated on said inner friction pad is received only by the latter friction pad guide pin contacting the other opening of said backing plate associated with said inner friction pad at entering side of rotation of said disc and the braking torque generated on said outer friction pad is received only by the former friction pad guide pin contacting one opening of said backing plate associated with said outer friction pad at entering side of rotation of said disc. Said friction pad guide pins are therefore respectively satisfactory in strength if each of them withstands the braking torque generated on one of said inner and outer friction pads, resulting in the advantage that the designing strength of said pins is lessened. In this arrangement, the other openings furnished on said backing plates of said inner and outer friction pads other than the openings with said clearances are fitted on said friction pad guide pins with no clearance or a clearance smaller than that described above.

The fourth purpose of the invention features in the arrangement that said friction pad guide pins are fitted at their ends into openings furnished on said support and secured by respective bolts to avoid loosening of said friction pad guide pins out of said corresponding openings. As a result, said friction pad guide pins are supported at their ends after the way of a cantilever and increased in the effective length of said guide pins to slide and guide said friction pads, thereby reducing the designing length of said pins.

Figure 2:
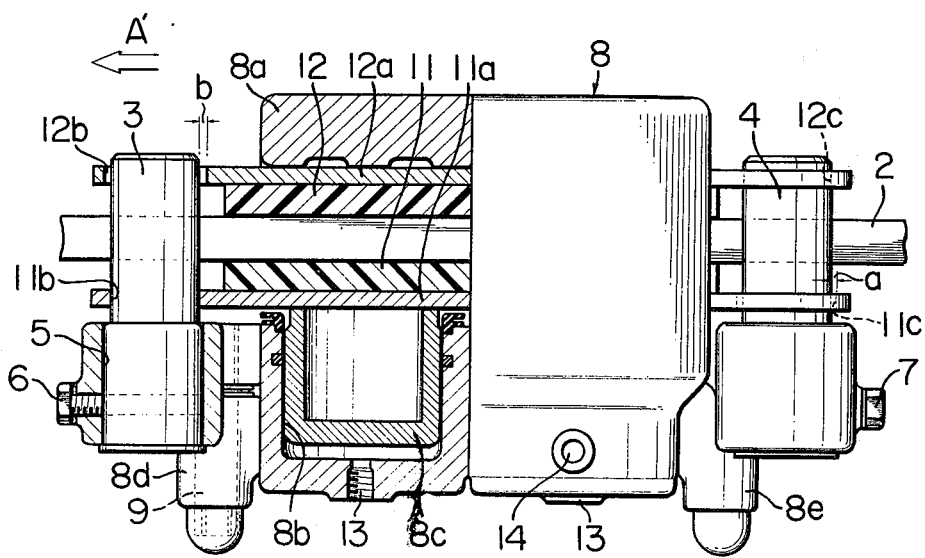
FIG. 2 is a sectional view A — A of FIG. 1.
Figure 3:
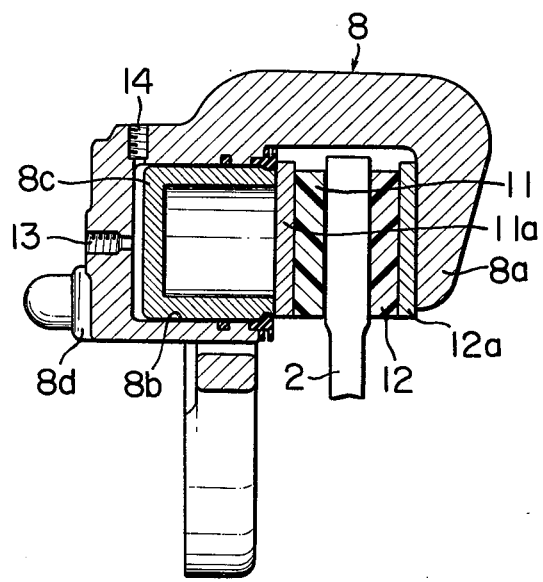
FIG. 3 is a sectional view B — B of FIG. 1.
Figure 4:
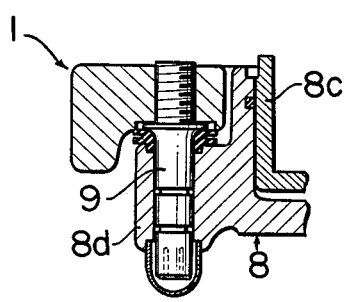
FIG. 4 is a sectional view C — C of FIG. 1.

Referring to the accompanying drawings, an embodiment of this invention is disclosed as follows. FIG. 1 is a front view illustrating an embodiment of this invention. FIG. 2 is a sectional view A — A of FIG. 1. FIG. 3 is a sectional view B — B of FIG. 1. FIG. 4 is a sectional view C — C of FIG. 1. The figures include: a support 1, a disc 2, friction pad guide pins 3 and 4, an opening 5, bolts 6 and 7, a caliper 8, caliper guide pins 9 and 10, an inner friction pad 11, an outer friction pad 12 and clearances $a$ and $b$.

A support 1 is located on one side of a disc 2 and fixed to a non-rotational vehicle element such as a knuckle, etc. A pair of left and right guide pins 3 and 4 parallel with a rotational axis of said disc 2 and positioned beyond the periphery of said disc 2 are received at their ends into openings 5 (FIG. 2 shows one of openings only) of said support 1 and secured to the latter with bolts 6 and 7 to lock said guide pins 3 and 4. A caliper 8, located between said guide pins 3 and 4, comprising a reacting portion 8a and an operating portion including a pair of fluid pressure operating means containing cylinder 8b and piston 8c, interposing said disc 2 between the former and the latter portions, is slidably mounted to a pair of caliper guide pins 9 and 10 in such a manner that left and right projecting portions 8d and 8e of said caliper 8 are connected with said support 1 through a pair of said caliper guide pins 9 and 10 which are secured at their ends to said support 1 and extend in opposite direction to said disc 2 and in parallel with a rotational axis of said disc as shown in FIG. 4. Said caliper 8 is therefore guided on said support 1 towards said disc 2. Said inner and outer friction pads 11 and 12 are guided towards said disc 2 through said friction pad guide pins 3 and 4 inserted into left and right openings 11b and 11c; 12b and 12c furnished on respective backing plates 11a and 12a of said inner and outer friction pads 11 and 12. Said one opening 11c of said backing plate 11a receives said one friction pad guide pin 4 with clearance $a$ at least at entering side of rotation of said disc and said one opening 12b of said backing plate 12a receives likewise said other friction pad guide pin 3 with clearance $b$ at least at entering side of rotation of said disc, and said other openings 11b and 12c respectively receive said friction pad guide pins 3 and 4 with no clearances or clearances smaller than those $a$ and $b$ at least at entering side of rotation of said disc.

Therefore, when said disc 2 rotates in direction of arrow A' in FIG. 2, the braking torque generated on said inner friction pad 11 is received by said friction pad guide pin 3 contacting with the right end of said left hand opening 11b of said backing plate 11a at entering side of rotation of said disc and that generated on said outer friction pad 12 is received by said friction pad guide pin 4 contacting with right end of said right hand opening 12c of said backing plate 12a at entering side of rotation of said disc in FIG. 2, and, therefore, the strength of said friction pad guide pins 3 and 4 is satisfactory if each of those pins withstands the braking torque generated on one of those friction pads, thereby minimizing the strength of each friction pad guide pin. Inlet ports 13 are used to introduce the fluid pressure into cylinders 8b and bleeders 14 are for bleeding.

The operation of the disc brake of this invention is described in accordance with FIG. 3. The introduction of the fluid pressure into said cylinders 8b through said inlet ports 13 from the pressure source (not shown) enables said pistons 8c to engage said inner friction pad 11 with said disc 2 and said reacting portion 8a of said caliper 8 moves to the left due to the reaction thereof to engage said outer friction pad 12 with said disc 2, thus generating the braking torque which is transmitted to said support 1 respectively through said friction pad guide pins 3 and 4. The replacement of said friction pads 11 and 12 due to wear is easily carried out by loosening said bolts 6 and 7 and removing said friction pad guide pins 3 and 4 from said openings 5 of said support 1 without dismounting said caliper 8.

Further, when said disc 2 rotates for instance in direction of arrow A' as indicated in FIGS. 1 and 2, said clearances a and b are provided respectively against said pins 4 and 3 only at entering side of rotation of said disc 2 (right side in FIG. 2). However, said clearances a and b may be also provided at opposite side to entry of the disc rotation so as to provide a remedy means for a reverse rotation of said disc and a production error of said openings 11b and 11c; 12b and 12c.

What is claimed is:
1. A floating caliper disc brake comprising:
 a. a rotatable brake disc;
 b. a support being located only on one side of said disc and fixed to a stationary vehicle element;
 c. two friction pad guide pins for respectively positioning each of a pair of friction pads in such a manner that said pads can be removed by withdrawing said guide pin means, said guide pin means being releasably secured to said support and extended towards said disc and in parallel with a rotational axis of said disc beyond the periphery of said disc;
 d. two caliper guide pins other than said two friction pad guide pins being secured to said support and extended towards the opposite direction to said disc and in parallel with the rotational axis of said disc;
 e. said pair of friction pads being disposed on the opposed sides of said disc and provided with openings on the side portions of a backing plate associated with each of said friction pads so that said openings of each of said friction pads slidably receive respectively one of said friction pad guide pins in such a manner that the pair of said friction pad guide pins absorb the braking torque generated on said friction pads during braking and the pair of said friction pads can be removed in a circumferential direction by removing said friction pad guide pins without dismounting said caliper and a wheel; and
 f. a caliper having an operating means which engages one of said friction pads with a surface of said disc and a reacting portion which engages another one of said friction pads with another surface of said disc due to the reaction of said operating means, and said caliper being positioned between said friction pad guide pins and guided in the direction of the rotational axis of said disc by means of said caliper guide pins.

2. A floating caliper disc brake as defined in claim 1, wherein either one of said friction pad guide pins is inserted through corresponding one of said openings on the backing plate associated with one of said friction pads and another one of said friction pad guide pins is inserted through corresponding one of said openings on the backing plate associated with another one of said friction pads, providing clearance between said former friction pad guide pin and said corresponding opening of said former friction pad and clearance between said latter friction pad guide pin and said corresponding opening of said latter friction pad.

3. A floating caliper disc brake as defined in claim 2, wherein another openings of said former and latter friction pads in the pair of said friction pads respectively receive corresponding latter and former friction pad guide pins, providing no clearance or a clearance smaller than said clearance therebetween.

4. A floating caliper disc brake as defined in claim 2, wherein inner and outer friction pads in the pair of said friction pads are respectively provided with openings at entering and outgoing sides of rotation of said disc to said friction pads, and opening at the entering side of said inner friction pad receives corresponding one of said friction pad guide pins with clearance therebetween at the entering side of the rotation of said disc.

* * * * *